United States Patent [19]
Kuroda et al.

[11] Patent Number: 5,471,870
[45] Date of Patent: Dec. 5, 1995

[54] COMBUSTION STATE-DETERMINING SYSTEM FOR INTERNAL COMBUSTION ENGINES

[75] Inventors: Shigetaka Kuroda; Yuichi Shimasaki, both of Wako, Japan

[73] Assignee: Honda Giken Kogyo Kabushiki Kaisha, Tokyo, Japan

[21] Appl. No.: 291,019

[22] Filed: Aug. 16, 1994

[30] Foreign Application Priority Data

Aug. 19, 1993 [JP] Japan ................... 5-226545

[51] Int. Cl.$^6$ ............................ G01M 15/00
[52] U.S. Cl. .................. 73/117.3; 73/116; 364/431.08
[58] Field of Search .................. 73/116, 117.3; 123/419, 436; 364/431.07, 431.08

[56] References Cited

U.S. PATENT DOCUMENTS

| | | | |
|---|---|---|---|
| 4,445,326 | 5/1984 | Lyon | 73/117.3 |
| 4,607,523 | 8/1986 | Takahashi et al. | 73/116 |
| 4,887,574 | 12/1989 | Kuroiwa et al. | 73/116 |
| 4,932,379 | 6/1990 | Tang et al. | 123/436 |
| 5,021,960 | 6/1991 | Manaka et al. | 123/436 |
| 5,041,979 | 8/1991 | Hirka et al. | 73/116 |
| 5,116,259 | 5/1992 | Demizu et al. | 73/117.3 |
| 5,127,262 | 7/1992 | Demizu et al. | 73/117.3 |
| 5,222,392 | 6/1993 | Baba et al. | 73/116 |
| 5,231,869 | 8/1993 | Klenk et al. | 73/116 |

FOREIGN PATENT DOCUMENTS 3-253770  11/1991  Japan .

*Primary Examiner*—Hezron E. Williams
*Assistant Examiner*—Eric S. McCall
*Attorney, Agent, or Firm*—Nikaido, Marmelstein, Murray & Oram

[57] ABSTRACT

A combustion state-determining system for an internal combustion engine, in which an ECU detects misfires occurring in the engine. A first counter counts the number of times of occurrence of misfires detected every predetermined number of firing cycles, and a second counter counts the number of times of occurrence of misfires detected every predetermined repetition period which is a predetermined integer times as long as the predetermined number of firing cycles. The count value of the first counter is compared with a first reference value and a second reference value smaller than the first reference value every predetermined number of firing cycles, to determine that the engine is in a combustion state adversely affecting at least one exhaust system component part when the former is larger than the latter. Further, the count value of the second counter is corrected by an updated value of the first counter when the updated count value is smaller than the first reference value and at the same time larger than the second reference value, and reset when first counter count value is smaller than the second reference value. The second counter count value is compared with a third reference value, to determine that the engine is in a degraded combustion state.

6 Claims, 8 Drawing Sheets

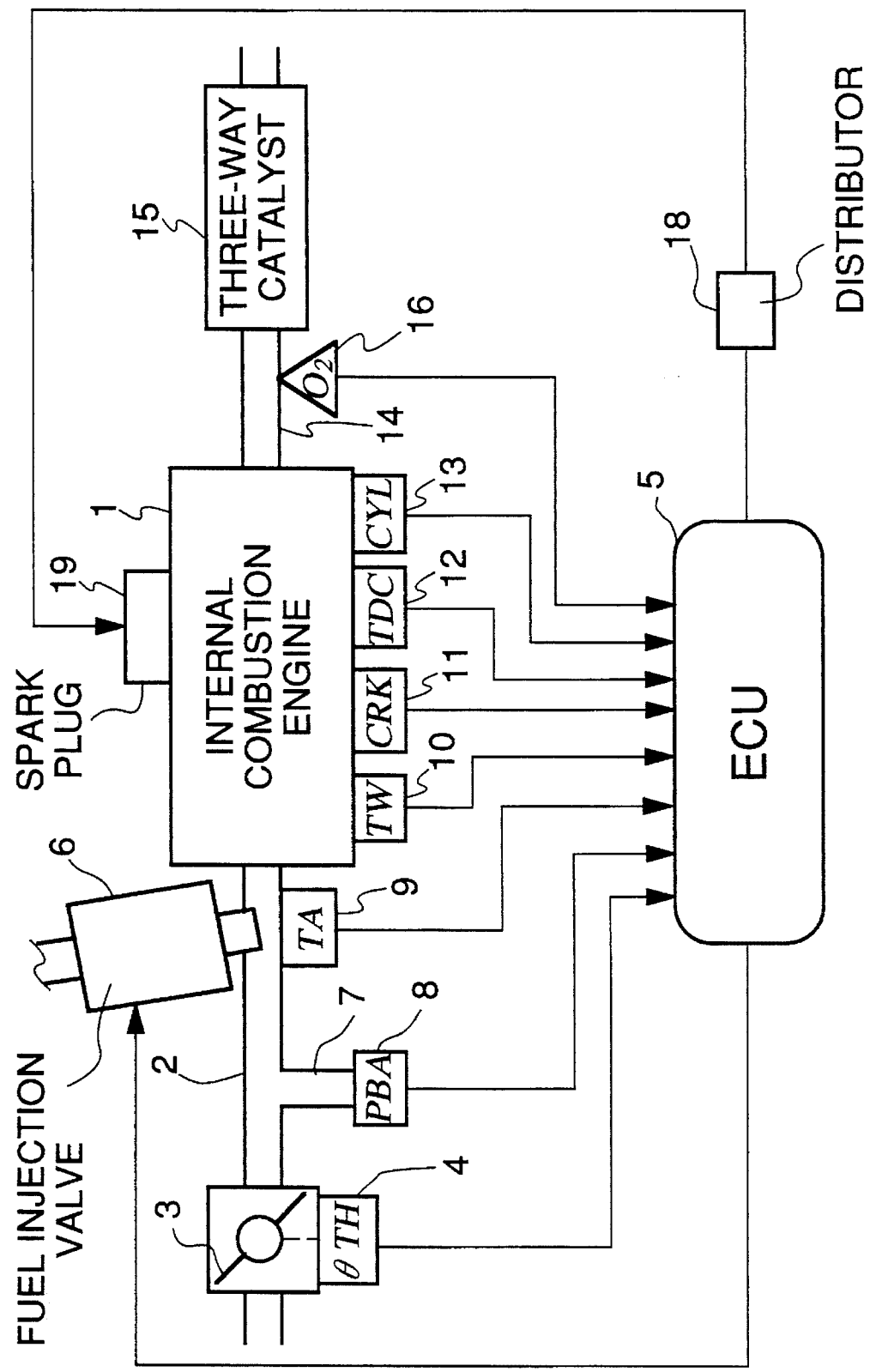

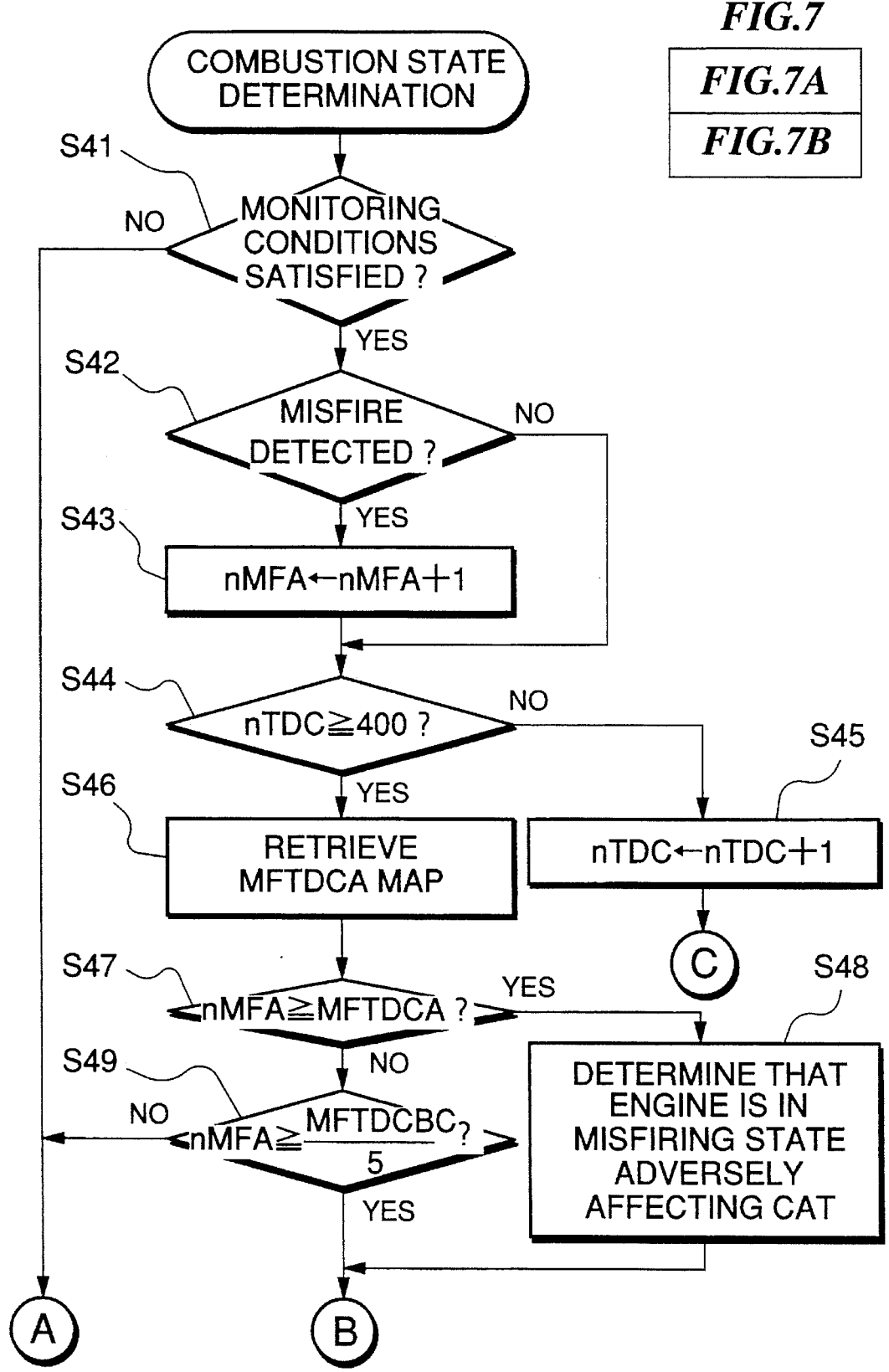

COMBUSTION STATE-DETERMINING SYSTEM FOR INTERNAL COMBUSTION ENGINES

BACKGROUND OF THE INVENTION

1. Field of the Invention

This invention relates to a combustion state-determining system for internal combustion engines, which detects misfires occurring in the engine, to thereby determine a state of combustion of the engine, based on the state of occurrence of misfires.

2. Prior Art

There is conventionally known a misfire-determining system for internal combustion engines, as proposed, for example, by Japanese Provisional Patent Publication (Kokai) No. 3-253770, which detects misfires occurring in the engine and determines that the combustion state of the engine is degraded (the engine is in a misfiring state) when misfires have occurred in the engine at a predetermined rate or more over a predetermined number of rotations of the engine.

To determine a misfiring state which causes degradation of the combustion state, however, the above proposed conventional system has to count the number of times of misfire occurrence over 1000 rotations of the engine. As a result, it can be erroneously determined that the engine is in an abnormal combustion state (continuous misfiring state), e.g. when transient misfires have temporarily and concentratedly occurred (e.g. misfires due to smoldering of a spark plug, surging of exhaust gas recirculation, etc.) during 1000 engine rotations, wherein the misfiring rate over the entire time period of 1000 engine rotations is so low that the transient misfiring state does not cause degradation of exhaust emission characteristics of the engine. In addition, the above conventional system is only capable of carrying out a mere determination as to whether the engine is in an abnormal combustion state, over a relatively long time period, but incapable of determining kinds of abnormal combustion states of the engine.

SUMMARY OF THE INVENTION

It is the object of the invention to provide a combustion state-determining system for internal combustion engines, which is capable of more accurately determining a continuous misfiring state of the engine, as well as discriminating kinds of abnormal combustion states of the engine, while preventing a misjudgment which can be made when the combustion state of the engine is determined based on a misfiring rate over a relatively long time period.

To attain the above object, the present invention provides a combustion state-determining system for an internal combustion engine having an exhaust system, and at least one exhaust system component part arranged in the exhaust system, comprising:

misfire-detecting means for detecting misfires occurring in the engine;

a first counter for counting a number of times of occurrence of misfires detected by the misfire-detecting means every predetermined number of firing cycles;

a second counter for counting a number of times of occurrence of misfires detected by the misfire-detecting means every predetermined repetition period which is a predetermined integer times as long as the predetermined number of firing cycles, the second counter having a count value thereof corrected every the predetermined number of firing cycles;

comparing means for comparing a count value of the first counter with a first predetermined reference value and a second predetermined reference value which is smaller than the first predetermined reference value, every the predetermined number of firing cycles;

first combustion state-determining means for determining that the engine is in a combustion state which adversely affects the at least one exhaust system component part arranged in the engine, when the count value of the first counter is larger than the first predetermined reference value;

count value-correcting means for correcting the count value of the second counter, by an updated value of the count value of the first counter, when the updated value of the count value of the first counter is smaller than the first predetermined reference value and at the same time larger than the second predetermined reference value;

resetting means for resetting the count value of the second counter when the count value of the first counter is smaller than the second predetermined reference value; and second combustion state-determining means for comparing the count value of the second counter with a third predetermined reference value, and determining that the engine is in a combustion state which degrades exhaust emission characteristics of the engine when the count value of the second counter is larger than the third predetermined reference value.

Preferably, the first predetermined reference value is determined based on operating conditions of the engine.

Also preferably, the third predetermined reference value is set to a value suitable for determining the combustion state of the engine every the predetermined repetition period which is the predetermined integer times as long as the predetermined number of firing cycles.

Preferably, the second predetermined reference value is set to a value 1/the predetermined integer times as large as the third predetermined reference value.

Alternatively, the second predetermined reference value may be set to a value 1/a second predetermined integer as large as the third predetermined reference value, the second predetermined integer being equivalent to a ratio of a counting cycle of the second counter to a counting cycle of the first counter.

Preferably, the second counter comprises a plurality of temporary storing parameters, the count value of the second counter being successively stored into a different one of the temporary storing parameters every the predetermined number of firing cycles, the combustion state-determining means comparing a sum of count values stored in the temporary storing parameters with the third predetermined reference value.

The above and other objects, features, and advantages of the invention will be more apparent from the following detailed description taken in conjunction with the accompanying drawings.

BRIEF DESCRIPTION OF THE DRAWINGS

FIG. 1 is a block diagram schematically showing the whole arrangement of an internal combustion engine and a combustion state-determining system therefor, according to an embodiment of the invention;

FIGS. 2A and 2B are flowcharts showing programs (main routines) for determining a state of combustion of the engine, in which:

FIG. 2A shows a CRK processing which is executed in synchronism with generation of a crank angle (CRK) signal; and FIG. 2B shows a TDC processing which is executed in synchronism with generation of a top dead center (TDC) signal;

FIG. 7A is a flowchart showing a subroutine for determining a combustion state of the engine, which is executed during execution of the FIG. 2B program;

DETAILED DESCRIPTION

Figure 2A:
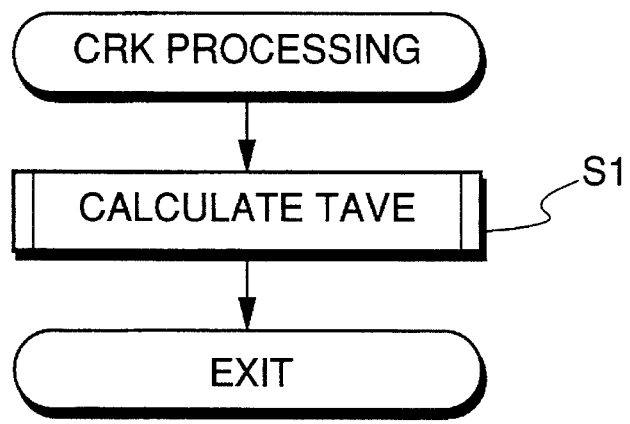

The invention will now be described in detail with reference to the drawings showing an embodiment thereof.

Referring first to FIG. 1, there is shown the whole arrangement of an internal combustion engine and a combustion state-determining system therefor, according to an embodiment of the invention. In an intake pipe 2 of the engine 1, there is arranged a throttle valve 3, to which is connected a throttle valve opening (θTH) sensor 4 for generating an electric signal indicative of the sensed throttle valve opening and supplying the same to an electronic control unit (hereinafter referred to as "the ECU") 5.

Fuel injection valves 6 are provided, respectively, for cylinders of the engine 1 and each arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3, for supplying an electric signal indicative of the sensed absolute pressure PBA to the ECU 5. An intake air temperature (TA) sensor 9 is inserted into the intake pipe 2 at a location downstream of the intake pipe absolute pressure sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "CYL signal pulses") at a predetermined crank angle of a particular cylinder of the engine 1. The TDC sensor 12 generates a TDC signal pulse at a predetermined crank angle before a top dead point (TDC) of each cylinder corresponding to the start of the intake stroke of the cylinder (e.g. whenever the crankshaft rotates through 180 degrees in the case where the engine is of the 4-cylinder type). The CRK sensor 11 generates crank angle pulses (hereinafter referred to as "CRK signal pulses") at predetermined crank angles with a repetition period shorter than the repetition period of TDC signal pulses (e.g. whenever the crankshaft rotates through 30 degrees). The CYL signal pulses, TDC signal pulses, and CRK signal pulses are supplied to the ECU 5.

Arranged in each cylinder of the engine 1 is a spark plug 19, which is electrically connected via a distributor 18 to the ECU 5.

A three-way catalyst 15 is arranged in an exhaust pipe 14 of the engine 1 for purifying components of HC, CO, NOx, and the like present in exhaust gases. Arranged in the exhaust pipe 14 at a location upstream of the three-way catalyst 15 is an oxygen concentration sensor 16 (hereinafter referred to as "the O2 sensor") as an air-fuel ratio sensor, for detecting the concentration of oxygen present in exhaust gases, and supplying a signal indicative of the sensed oxygen concentration to the ECU 5.

The ECU 5 is comprised of an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6.

The CPU 5b operates in response to the abovementioned various engine parameter signals from the various sensors to determine operating conditions in which the engine 1 is operating, and calculates, based upon the determined engine operating conditions, a fuel injection period for each of the fuel injection valves 6 in synchronism with generation of TDC signal pulses, and ignition timing for each of the spark plugs 19, to supply signals for driving the fuel injection valves 6 and the spark plugs 19 from the output circuit 5d.

Figure 2B:
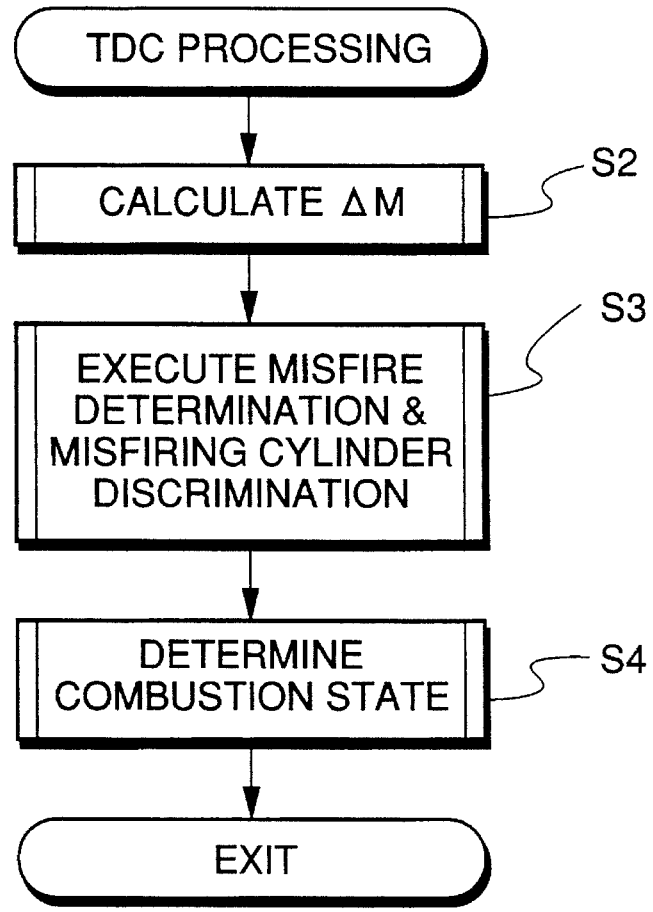

FIGS. 2A and 2B show main routines for determining a state of combustion of the engine 1, which are executed by the CPU 5b.

FIG. 2A shows a CRK processing carried out in synchronism with generation of CRK signal pulses. At a step S1 in the figure, an average value TAVE (hereinafter referred to as "the first average value") of time intervals of occurrence of CRK signal pulses is calculated. The time intervals are proportional to the reciprocal of the engine rotational speed.

FIG. 2B shows a TDC processing carried out in synchronism with generation of TDC signal pulses. In the present processing, a rate of variation ΔM in an average value M (hereinafter referred to as "the second average value") of the first average values TAVE calculated in the above CRK processing is obtained at a step S2, and then, based on the thus obtained ΔM value, it is determined at a step S3 whether or not a misfire has occurred in the engine and which cylinder has misfired. Further, it is determined at a step S4 whether or not the engine is in an abnormal combustion state, based on the number of times of misfire occurrence determined as above.

Figure 3:
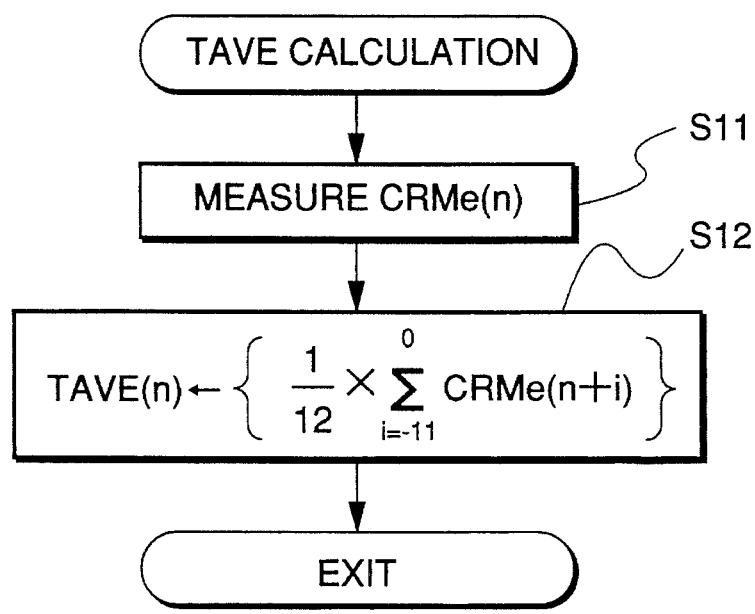
FIG. 3 is a flowchart showing a subroutine for calculating a first average value TAVE, which is executed during execution of the FIG. 2A program.

FIG. 3 shows a subroutine for calculating the first average value TAVE, which is executed at the step S1 of the FIG. 2A program.

Figure 4:
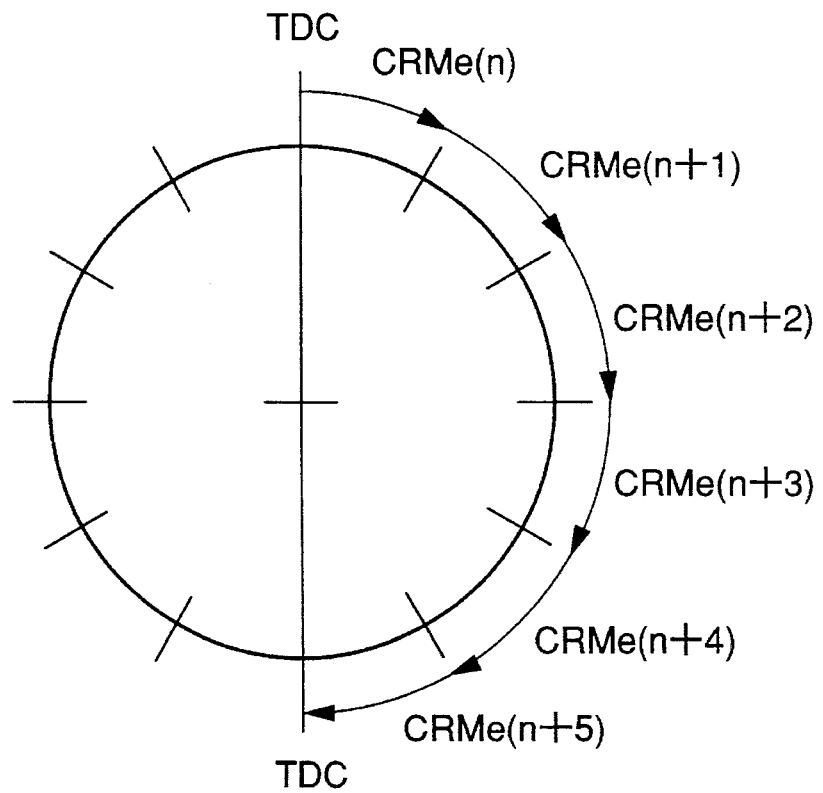
FIG. 4 is a diagram showing the relationship between measurement of a parameter CRMe representative of the engine rotational speed and the rotational angle of the crankshaft.

At a step S11, time intervals CRMe(n) of occurrence of CRK signal pulses are calculated. More specifically, time interval values of CRMe(n), CRMe(n+1), CRMe(n+2) . . . are successively measured whenever the crankshaft rotates through 30 degrees, as shown in FIG. 4.

At a step S12, a first average value TAVE(n) is calculated, which is an average value of 12 CRMe values from a value CRMe(n−11) measured eleven loops before the present loop to a value CRMe(n) in the present loop, by the use of the following equation (1):

$$TAVE(n) = 1/12 \times \sum_{i=-11}^{0} CRMe(n+i) \qquad (1)$$

In the present embodiment, since CRK signal pulses are each generated whenever the crankshaft rotates through 30 degrees, the first average value TAVE(n) is obtained over one rotation of the crankshaft. The first average value TAVE(n) obtained by such averaging every period of one rotation of the crankshaft is free of the influence of primary vibration components in engine rotation over a period of one rotation of the crankshaft, i.e. noise components due to dimensional errors (such as manufacturing tolerances and mounting tolerances) of a pulser or a pickup forming the crank angle sensor 11.

The engine rotational speed NE is also calculated based on the TAVE(n) value.

Figure 5:
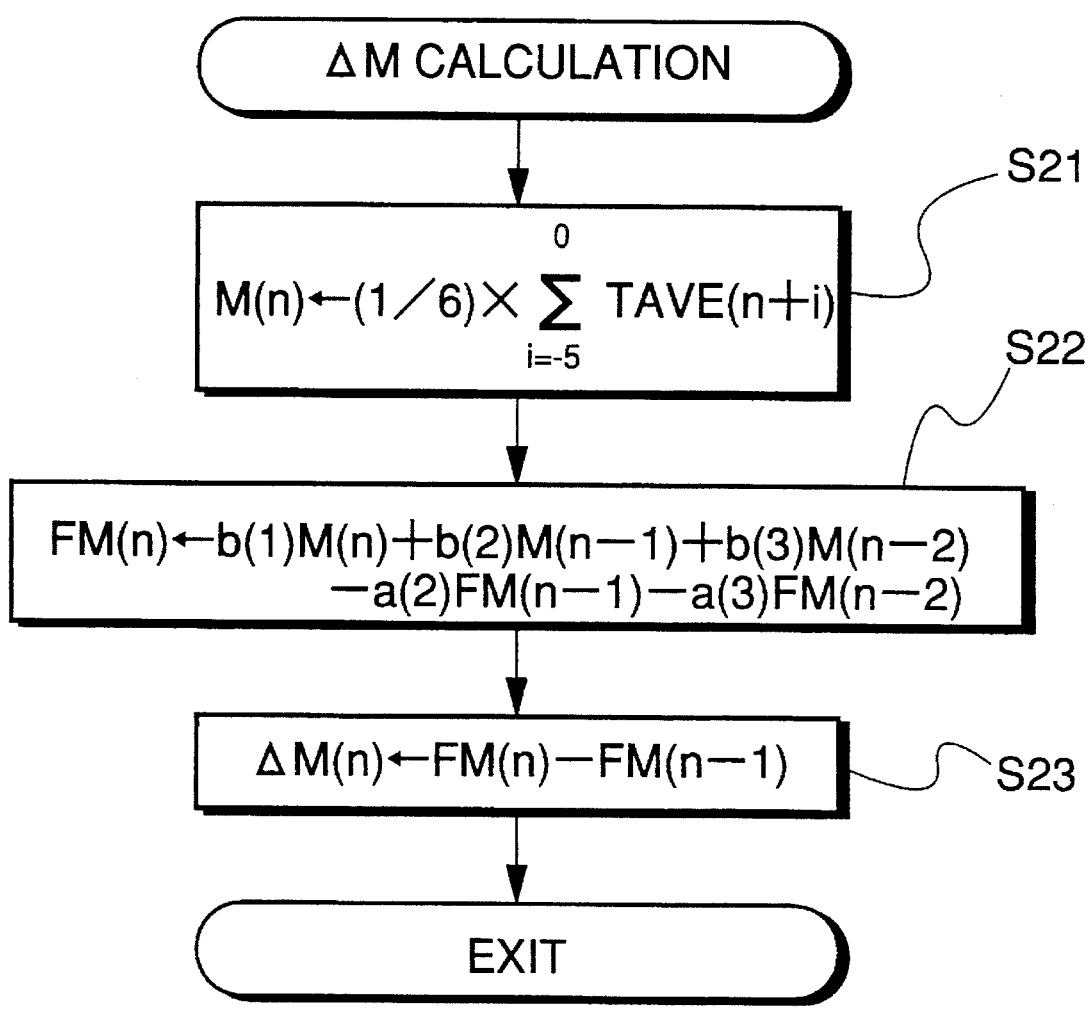
FIG. 5 is a flowchart showing a subroutine for calculating a parameter ΔM representative of a rate of variation in the engine rotational speed, which is executed during execution of the FIG. 2B program.

FIG. 5 shows a subroutine for calculating the rate of variation ΔM, which is executed at the step S2 of the FIG. 2B program.

At a step S21, a second average value M(n) is calculated by averaging six TAVE values from a value TAVE(n−5) obtained five loops before the present loop to a value TAVE(n) in the present loop, by the use of the following equation (2):

$$M(n) = 1/6 \times \sum_{i=-5}^{0} TAVE(n+i) \qquad (2)$$

In the present embodiment, the engine 1 is a 4-cylinder/4-cycle engine, wherein spark ignition is carried out at any one of the cylinders (#1 cylinder to #4 cylinder) whenever the crankshaft rotates through 180 degrees. Therefore, the second average value M(n) is obtained from the first average value TAVE(n) over one firing period. The second average value M(n) obtained by such averaging per ignition cycle is free of secondary vibration components representing a variation in torque of the engine due to combustion, i.e. vibration components in engine rotation over a period of a half rotation of the crankshaft.

At the following step S22, the second average value M(n) thus calculated is subjected to high-pass filtering by the use of the following equation (3), to obtain a high-pass filtered second average value FM(n):

$$FM(n)=b(1) \times M(n)+b(2) \times M(n-1)+b(3) \times M(n-2)-a(2)FM(n-1)-a(3)FM(n-2) \qquad (3)$$

where b(1) to b(3), a(2), and a(3) represent filter transmission coefficients, which assume, for example, 0.2096, −0.4192, 0.2096, 0.3557, and 0.1940, respectively. When n in the equation (3) assumes 0 or 1, FM(0) and FM(1) are set to zero, and therefore, the equation (3) is effectively applied when n assumes a value of 2 or more.

The high-pass filtered second average value FM(n) obtained as above is free of frequency components lower than about 10 Hz contained in the M(n) value, to thereby eliminate the adverse effect of vibrations (e.g. vibrations due to torsion of the crankshaft and road surface vibrations transmitted through wheels of a vehicle on which the engine is installed) transmitted from a driving system of the vehicle to the engine.

At a step S23, a rate of variation ΔM(n) in the high-pass filtered second average value FM(n) is calculated by the use of the following equation (4):

$$\Delta M(n)=FM(n)-FM(n-1) \qquad (4)$$

The high-pass filtered second average value FM(n) is inverted in sign from that of the M(n) value. Therefore, when a misfire has occurred in the engine 1, the M(n) value increases, which in turn causes an increase in the FM(n) value in the negative direction and accordingly an increase in the ΔM(n) value in the negative direction.

Figure 6:
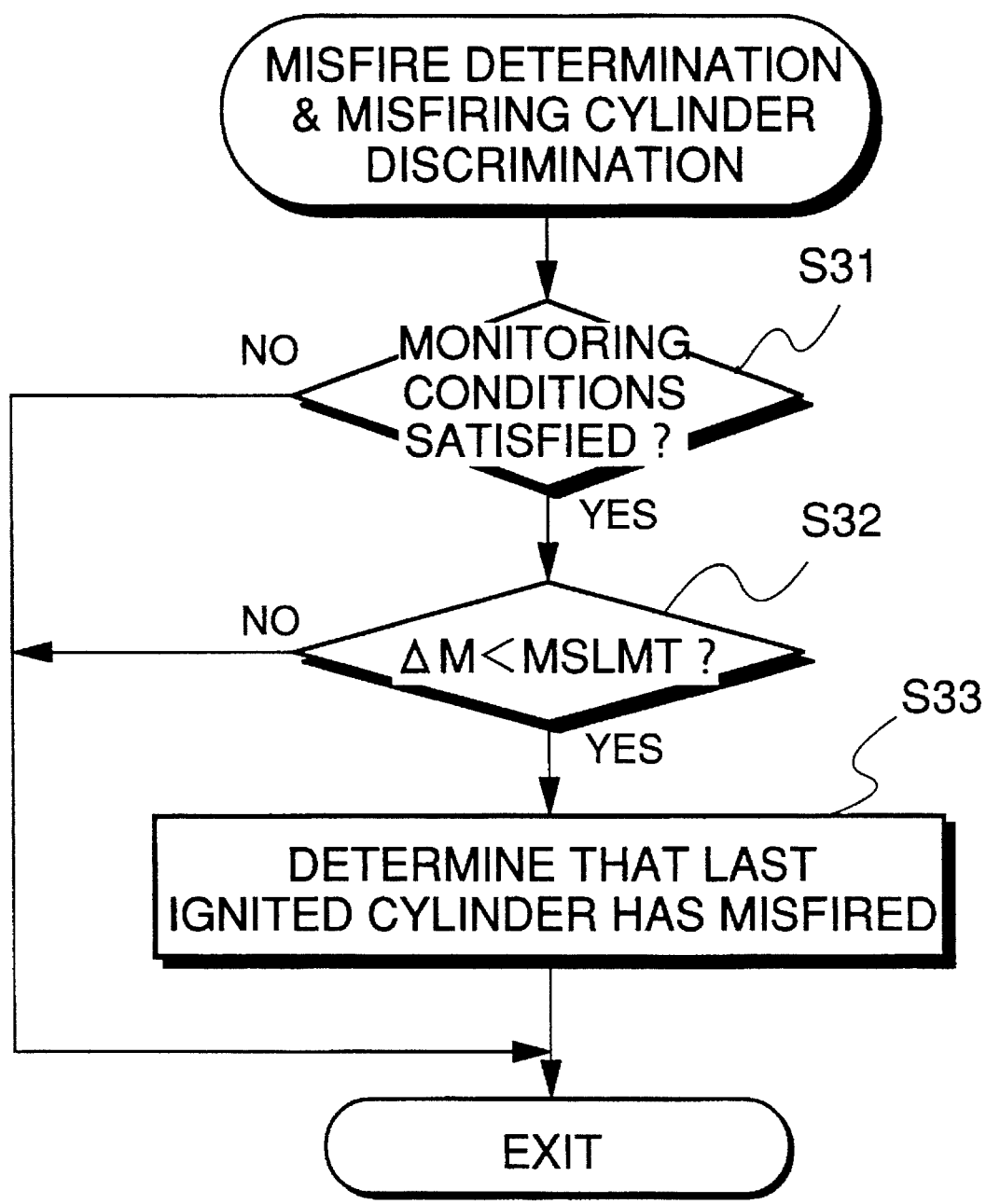
FIG. 6 is a flowchart showing a subroutine for executing a misfire determination and a misfiring cylinder discrimination, which is executed during execution of the FIG. 2B program.

FIG. 6 shows a subroutine for carrying out the misfire determination and the misfiring cylinder discrimination, based on the rate of change ΔM calculated as above.

At a step S31, it is determined whether or not the aforesaid monitoring conditions are satisfied, i.e. whether or not the misfire determination can be executed. The monitoring conditions are satisfied, for example, when the operating condition of the engine is steady, and at the same time the engine coolant temperature TW, the intake air temperature TA, and the engine rotational speed NE, etc. fall within respective predetermined ranges.

If the monitoring conditions are not satisfied, the present program is immediately terminated. On the other hand, if the monitoring conditions are satisfied, the program proceeds to a step S32, wherein it is determined whether or not the rate of variation ΔM is smaller than a predetermined negative value MSLMT, i.e. whether or not |ΔM|>|MSLMT|stands. The predetermined negative value MSLMT is read from a map which is set in accordance with the engine rotational speed NE and the engine load (intake pipe absolute pressure PBA). The absolute value of the MSLMT value is set to a smaller value as the engine rotational speed NE increases, and set to a larger value as the engine load increases.

If the answer to the question at the step S32 is negative (NO), i.e. if ΔM≧MSLMT stands, the program is immediately terminated. On the other hand, if the answer to the question at the step S32 is affirmative (YES), i.e. if ΔM<MSLMT stands, it is determined at a step S33 that a misfire has occurred in a cylinder where spark ignition took place in the loop before the last loop. This is because, as described hereinabove, a value ΔM(n) increases in the negative direction when a misfire has occurred.

The reason why it is determined that a misfire has occurred in the cylinder ignited in the loop before the last loop is that the high-pass filtering causes a delay in obtaining the second average value FM(n).

Figure 7B:
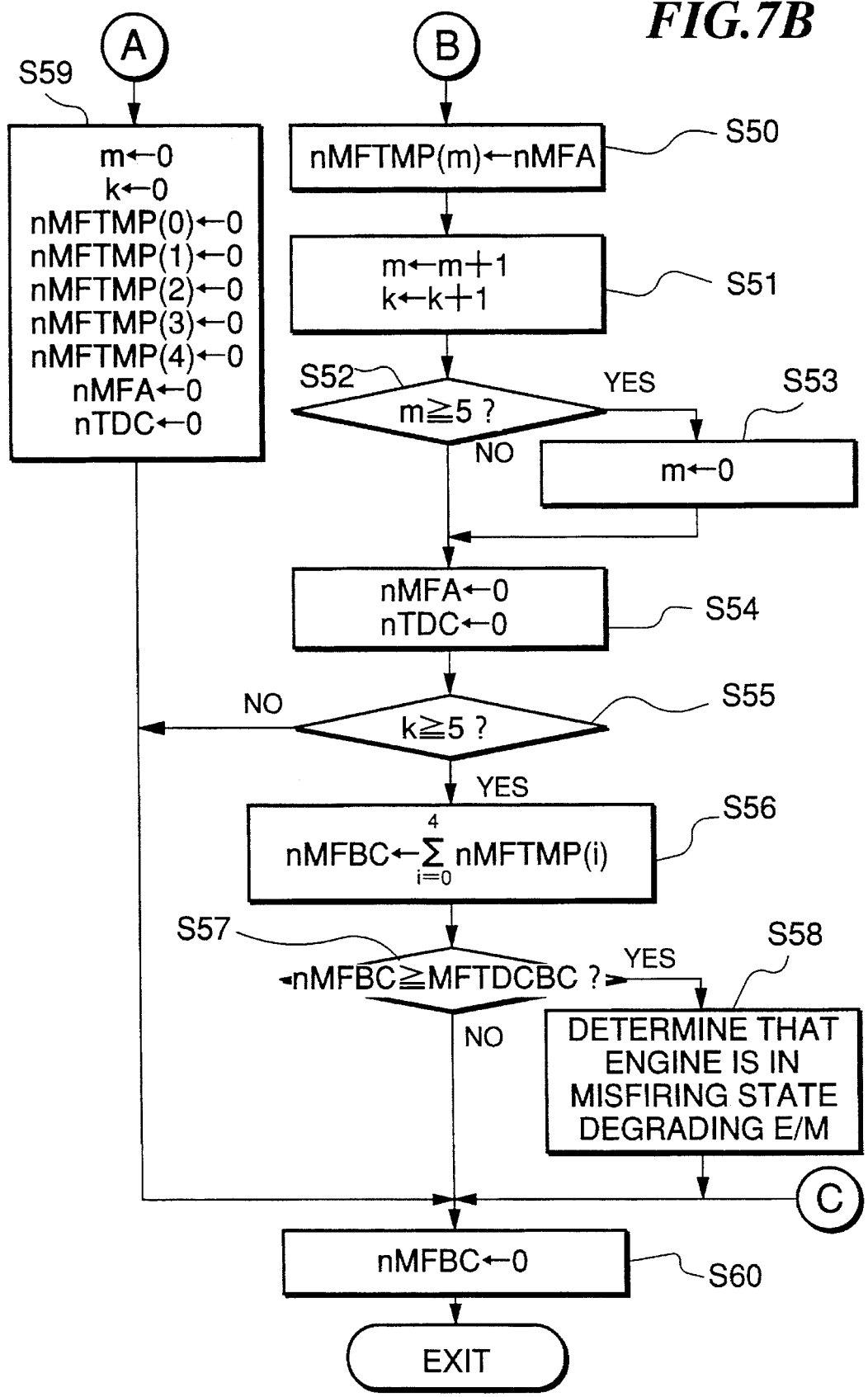
FIG. 7B is a continued part of the flowchart of FIG. 7A.

FIGS. 7A and 7B shows a subroutine for determining the combustion state of the engine, based on the state of misfire occurrence, which is executed at the step S4 in FIG. 2B.

First, at a step S41, similarly to the step S31 in FIG. 6, it is determined whether or not the aforesaid monitoring conditions are satisfied. If the monitoring conditions are not satisfied, parameters to be used in the present program are initialized at steps S59 and S60, followed by terminating the routine.

If the monitoring conditions are satisfied, it is determined at a step S42 whether or not a misfire has been detected. If a misfire has been detected, the count value of a first misfire counter (first counter) nMFA is increased by a value of "1" at a step S43, and then a step S44 is executed. On the other hand, if no misfire has been detected, the program jumps to the step S44, wherein it is determined whether or not the count value of a TDC counter nTDC is equal to 400 or more. If the count value is smaller than 400, it is increased by "1" at a step S45, and then the step S60 is executed, followed by terminating the routine, whereas if the count value of the counter nTDC becomes equal to 400 at the step S44, the program proceeds to a step S46, wherein an MFTDCA map is retrieved in accordance with the engine rotational speed NE and the intake pipe absolute pressure PBA. The MFT-DCA map, not shown, is set such that a first reference value MFTDCA for determining a combustion state of the engine is determined based on the engine rotational speed NE and the intake pipe absolute pressure PBA.

At the following step S47, it is determined whether or not the count value of the counter nMFA is equal to or more than the first reference value MFTDCA. If nMFA≧MFTDCA stands, it is determined at a step S48 that the engine is in a combustion state (misfiring state) which adversely affects the three-way catalyst arranged in the exhaust system, and then the program proceeds to a step S50.

On the other hand, if nMFA<MFTDCA stands, it is determined at a step S49 whether or not the count value of the counter nMFA is equal to or more than the value MFTDCBC/5. MFTDCBC represents a reference value (third reference value) for determining a combustion state of the engine every predetermined time period (2000 firing cycles) which is five times as long as the time period (400 firing cycles) over which 400 TDC signal pulses are generated, and MFTDCBC/5 represents a second reference value which is smaller than the first reference value.

If nMFA<MFTDCBC/5 stands, the steps S59 and S60 are executed, whereas if nMFA≧MFTDCBC/5 stands, the count value of the counter nMFA is stored into a temporary storing parameter nMFTMP(m) (m=0 to 4) which forms a second misfire counter (second counter) nMFBC, at the step S50. At a step S51, values of parameters m and k are both incremented by "1", and then it is determined at a step S52 whether or not the parameter m assumes 5 or more. If m≧5 stands, the m value is reset to 0 at a step S53, whereas if m<5 stands, the program immediately proceeds to a step S54, wherein the count values of the first misfire counter nMFA and the TDC counter nTDC are both reset to "0". Repeated execution of the steps S52 and S53 causes a change in the parameter value m in the order of 0→1 →2→3→4→0→1 . . .

Then, at a step S55, it is determined whether or not the value of the parameter k is 5 or more, and if k <5 stands, the step S60 is executed.

If k≧5 stands, the count value of the second misfire counter nMFBC is calculated at a step S56, by the use of the following equation (5):

$$nMFBC = \sum_{i=0}^{4} nMFTMP(i) \quad (5)$$

At a step S57, it is determined whether or not the count value of the counter nMFBC is larger than the third reference value MFTDCBC. If nMFBC<MFTDCBC stands, the step S60 is executed, whereas if nMFBC≧ MFTDCBC stands, it is determined at a step S58 that the engine is in a combustion state (misfiring state) which degrades exhaust emission characteristics of the engine, and then the step S60 is executed.

The above manner of determination of the engine combustion state will be described in detail with reference to FIG. 8.

Figure 8:
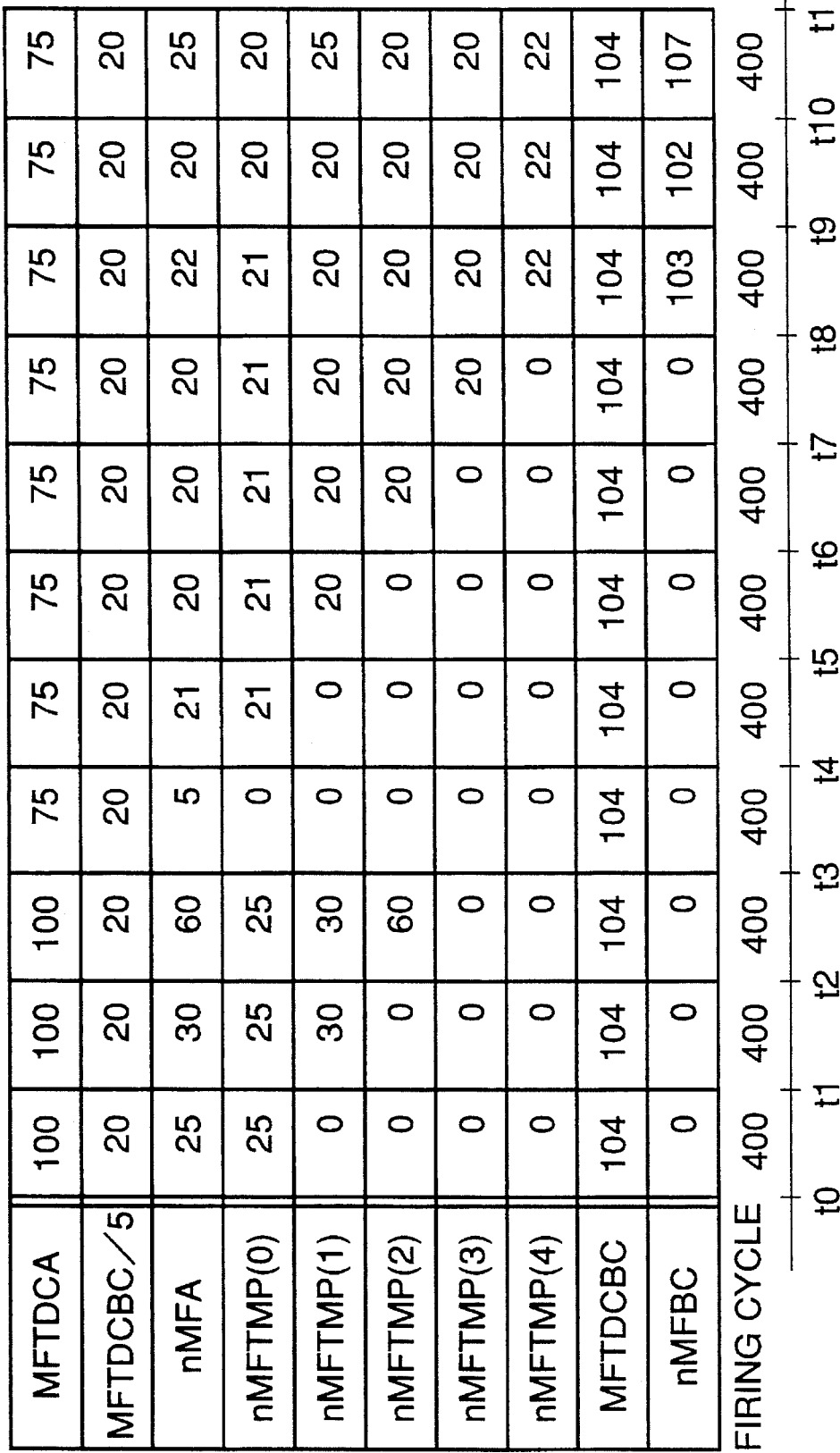
FIG. 8 is a diagram useful in explaining a manner of determination of a combustion state of the engine, based on the flowchart of FIGS. 7A and 7B.

FIG. 8 shows, by way of example, values of the counters and parameters obtained at time points of t1 to t11, at each of which 400 firing cycles has been executed, provided that the monitoring conditions executed at the step S41 in FIG. 7A become satisfied at a time point t0.

The count value of the counter nMFA assumes "25" at the time point t1, which corresponds to the number of times of misfire occurrence over a time period from t0 to t1. This value is stored into a temporary storing parameter nMFTMP(0).

The count value of the counter HFA assumes "30" and "60" at the time points t2 and t3, respectively, which are stored into temporary storing parameters nMFTMP(1) and nMFTMP(2), respectively. The number of times of misfire occurrence over a time period from t0 to t3 is equal to "115" (25+30+60), which exceeds the third reference value MFT-DCBC (=104). However, then k is set to "3", which means that the step S56 is not executed, and the count value of the second misfire counter nMFBC is set to 0 at the step S60, whereby it is not determined that the engine is in a combustion state which causes degradation of exhaust emission characteristics of the engine.

At the time point 4A the count value of the counter nMFA is "5", which is smaller than the second reference value MFTDCBC/5, and accordingly the program proceeds from the step S49 to the step S59, wherein the temporary storing parameters nMFTMP(0) to nMFTMP(4) are all reset to "0".

At the time points t5 to t9, count values of the counter nMFA then assumed are successively stored into the temporary storing parameters nMFTMP(m) (m=0 to 4). At the time point t9, h is set to 5, and accordingly the steps S56 and S57 are executed. On this occasion, nMFBC=103 stands, which, however, is smaller than the third reference value MFTDCBC, whereby it is not determined that the engine is in a combustion state which degrades exhaust emission characteristics of the engine.

At the time point t10, the value of the temporary storing parameter nMFTMP{0} is corrected from 21 to 20, based on the updated count value of the nMFA counter. However, nMFBC (=102)<MFTCBC remains satisfied.

At the time point t11, the value of the temporary storing parameter nMFTMP(1) is corrected from 20 to 25 and accordingly nMFBC (=107)>MFTDCBC stands, whereby it is determined that the engine is in a combustion state which degrades exhaust emission characteristics of the engine, at the step S58.

In the example shown in FIG. 8, the count value of the first misfire counter MFA never exceeds the first reference value MFTDCA.

As described in detail hereinabove, according to the present embodiment, even when transient misfires temporarily and concentratedly occur, for example, during the time period from t0 to t3, if the number of times of misfire occurrence decreases thereafter, the second misfire counter nMFBC is reset at the time point t4. Thus, a misjudgment can be prevented that the engine is in a continuous misfiring state which degrades exhaust emission characteristics of the engine. Therefore, a combustion state of a relatively slight degree of abnormality can be determined more accurately.

According to the present embodiment, the second reference value is set to a value ⅕ as large as the third reference value MFTDCBC, which, however, is not limitative, but it may be set to a proper value smaller than the first reference value MFTDCA, and preferably to a value close to a value MFTDCBC/K. K represents an integer value equivalent to the ratio of the counting cycle of the second misfire counter nMFBC to the counting cycle of the first misfire counter MFA.

What is claimed is:

1. A combustion state-determining system for an internal combustion engine having an exhaust system, and at least one exhaust system component part arranged in said exhaust system, comprising:

misfire-detecting means for detecting misfires occurring in said engine;

a first counter for counting a number of times of occurrence of misfires detected by said misfire-detecting means every predetermined number of firing cycles;

a second counter for counting a number of times of occurrence of misfires detected by said misfire-detecting means every predetermined repetition period which is a predetermined integer times as long as said predetermined number of firing cycles, said second counter having a count value thereof corrected every said predetermined number of firing cycles;

comparing means for comparing a count value of said first counter with a first predetermined reference value and a second predetermined reference value which is smaller than said first predetermined reference value, every said predetermined number of firing cycles;

first combustion state-determining means for determining that said engine is in a combustion state which adversely affects said at least one exhaust system component part arranged in said engine, when the count value of said first counter is larger than said first predetermined reference value;

count value-correcting means for correcting the count value of said second counter, by an updated value of the count value of said first counter, when the updated value of the count value of said first counter is smaller than said first predetermined reference value and at the same time larger than said second predetermined reference value;

resetting means for resetting the count value of said second counter when the count value of said first counter is smaller than said second predetermined reference value; and second combustion state-determining means for comparing the count value of said second counter with a third predetermined reference value, and determining that said engine is in a combustion state which degrades exhaust emission characteristics of said engine, when the count value of said second counter is larger than said third predetermined reference value.

2. A combustion state-determining system as claimed in claim 1, wherein said first predetermined reference value is determined based on operating conditions of said engine.

3. A combustion state-determining system as claimed in claim 1, wherein said third predetermined reference value is set to a value suitable for determining the combustion state of said engine every said predetermined repetition period which is said predetermined integer times as long as said predetermined number of firing cycles.

4. A combustion state-determining system as claimed in claim 3, wherein said second predetermined reference value is set to a value 1/said predetermined integer times as large as said third predetermined reference value.

5. A combustion state-determining system as claimed in claim 3, wherein said second predetermined reference value is set to a value 1/a second predetermined integer as large as said third predetermined reference value, said second predetermined integer being equivalent to a ratio of a counting cycle of said second counter to a counting cycle of said first counter.

6. A combustion state-determining system as claimed in claim 1, wherein said second counter comprises a plurality of temporary storing parameters, the count value of said second counter being successively stored into a different one of said temporary storing parameters every said predetermined number of firing cycles, said combustion state-determining means comparing a sum of count values stored in said temporary storing parameters with said third predetermined reference value.

* * * * *